United States Patent
Schindler et al.

(10) Patent No.: US 7,153,923 B2
(45) Date of Patent: *Dec. 26, 2006

(54) RAPID-CURE, ONE-COMPONENT MIXTURES, WHICH CONTAIN ALKOXYSILANE-TERMINATED POLYMERS

(75) Inventors: Wolfram Schindler, Tüßling (DE); Volker Stanjek, München (DE); Bernd Pachaly, Mehring (DE)

(73) Assignee: Consortium fur Elektrochemische Industrie GmbH, Munich (DE)

( * ) Notice: Subject to any disclaimer, the term of this patent is extended or adjusted under 35 U.S.C. 154(b) by 2 days.

This patent is subject to a terminal disclaimer.

(21) Appl. No.: 10/487,178

(22) PCT Filed: Jun. 27, 2002

(86) PCT No.: PCT/EP02/07127

§ 371 (c)(1),
(2), (4) Date: Feb. 16, 2004

(87) PCT Pub. No.: WO02/018658

PCT Pub. Date: Mar. 6, 2003

(65) Prior Publication Data

US 2004/0204539 A1    Oct. 14, 2004

(30) Foreign Application Priority Data

Aug. 28, 2001  (DE) ................. 101 42 050

(51) Int. Cl.
    C08G 77/60    (2006.01)
(52) U.S. Cl. .............. 528/35; 528/25; 528/28; 528/29
(58) Field of Classification Search ........... 106/387.1; 428/447–452
    See application file for complete search history.

(56) References Cited

U.S. PATENT DOCUMENTS 3,895,043 A    7/1975   Wagner et al.
3,971,751 A    7/1976   Isayama et al.
4,950,707 A *  8/1990   Shimizu et al. ............. 524/609
5,254,657 A    10/1993  Inoue
5,399,607 A    3/1995   Nanbu et al.
6,552,118 B1 * 4/2003   Fujita et al. ................ 524/588
6,676,740 B1 * 1/2004   Matsumura et al. ..... 106/287.1
6,790,903 B1 * 9/2004   Majolo et al. .............. 524/506
2002/0103321 A1* 8/2002  Jyono et al. .................. 528/10
2004/0029990 A1* 2/2004  Fujita et al. .................. 522/99

FOREIGN PATENT DOCUMENTS

DE    198 49 817 A1    5/2000
EP    0 269 819        6/1988
EP    0 931 800 A1     7/1999
WO    WO96/34040       10/1996
WO    WO00/37533       6/2000

OTHER PUBLICATIONS

Derwent Abstract corresponding to DE 198 49 817 (AN 2000-351610).
Derwent Abstract corresponding to EP 0 269 819 (AN 1988-127115).
Patent Abstract of Japan corresponding to JP 2000-017042.
Patent Abstract of Japan corresponding to JP 06-238817.

* cited by examiner

*Primary Examiner*—Marc S. Zimmer
(74) *Attorney, Agent, or Firm*—Brooks Kushman P.C.

(57) ABSTRACT

One-component, moisture curing compositions which exhibit rapid curing, even with exceptionally low levels of catalyst or with no catalyst at all, can be formulated from alkoxysilane-terminated polymers having alkoxysilane groups bonded to an electronegative, free electron-pair-containing heteroatom via a methylene linking group. Polymer blends containing the alkoxysilane-terminated polymers exhibit rapid cure, even at room temperature, and allow the use of nitrogen containing components such as adhesion promoters.

20 Claims, No Drawings

RAPID-CURE, ONE-COMPONENT MIXTURES, WHICH CONTAIN ALKOXYSILANE-TERMINATED POLYMERS

BACKGROUND OF THE INVENTION

1. Field of the Invention

The invention relates to one-component blends comprising alkoxysilane-terminated polymers which display a high cure rate at room temperature, and to their use.

2. Description of the Related Art

Polymer systems which include reactive alkoxysilyl groups have been known for a long time. In the presence of atmospheric humidity these alkoxysilane-terminated polymers are capable even at room temperature of undergoing condensation with one another, accompanied by elimination of the alkoxy groups. Depending on the level of alkoxysilane groups present and their structure, the polymers formed by this reaction are primarily long-chain polymers (thermoplastics), relatively wide-meshed three-dimensional networks (elastomers) or else highly crosslinked systems (thermosets).

The polymers in question can be either alkoxysilane-terminated polymers with an organic backbone, e.g., polyurethanes, polyesters, polyethers, etc., described in documents including EP-A-269 819, EP-A-931 800, WO 00/37533, U.S. Pat. No. 3,971,751, and DE 19849 817, or polymers whose backbone is composed wholly or at least partly of organosiloxanes, described in documents including WO 96/34030 and U.S. Pat. No. 5,254,657.

In accordance with the countless possibilities for designing such silane-terminated polymer systems it is possible to vary almost arbitrarily not only the properties of the non-crosslinked polymers or of the polymer-containing mixtures (viscosity, melting point, solubilities, etc.) but also the properties of the finished crosslinked compositions (hardness, elasticity, tensile strength, breaking extension, heat resistance, etc.). Just as diverse, accordingly, are the possibilities for use of such silane-terminated polymer systems. Thus they can be used, for example, for producing elastomers, sealants, adhesives, elastic adhesive systems, rigid and flexible foams, any of a wide variety of coating systems, and in the medical sector, for example, for impression compounds in the dental sector. These products can be applied in any form, such as by brushing, spraying, pouring, pressing, troweling, etc.

A disadvantage of all known alkoxysilane-terminated polymer systems, however, is their no more than moderate reactivity toward moisture, either in the form of atmospheric humidity or in the form of (optionally added) water. In order to achieve a sufficient cure rate at room temperature, therefore, it is vital to add a catalyst. The principal problem of doing so is that the organotin compounds generally employed as catalysts are toxicologically objectionable. Moreover, the tin catalysts often still contain traces of highly toxic tributyltin derivatives.

The relatively low reactivity of the alkoxysilane-terminated polymer systems is a particular problem when the terminations used are not methoxysilyl terminations but rather the even less reactive ethoxysilyl terminations. And yet in many cases ethoxysilyl terminated polymers would be particularly advantageous, since the only elimination product of their curing is ethanol.

In order to get around this problem searches have already been undertaken for tin-free catalysts. Consideration may be given here in particular to titanium catalysts, e.g., titanium tetraisopropoxide or bis(acetylacetonato)diisobutyl titanate (described in documents including EP 0 885 933). These titanium catalysts, though, have the disadvantage that they cannot be used together with many nitrogen compounds, since in that case the latter act as catalyst poisons. The use of these nitrogen compounds, as adhesion promoters for example, would be desirable in many cases, however.

Of great advantage would therefore be alkoxysilane-terminated polymer systems which inherently have such high reactivity that the amount of tin catalyst could be greatly reduced. Of particular advantage in this context would be the ability to do entirely without tin and other heavy metal catalysts.

SUMMARY OF THE INVENTION

It has now been surprisingly discovered that one-component, moisture curing compositions which exhibit rapid curing, even with exceptionally low levels of catalyst or with no catalyst at all, can be formulated from alkoxysilane-terminated polymers having alkoxysilane groups bonded to an electronegative, free electron-pair-containing heteroatom via a methylene linking group. Polymer blends containing the alkoxysilane-terminated polymers exhibit rapid cure, even at room temperature, and allow the use of nitrogen containing components such as adhesion promoters.

DETAILED DESCRIPTION OF THE PREFERRED EMBODIMENT(S)

The invention provides polymer blends comprising alkoxysilane-terminated polymers (A) having end groups of the general formula (1)

$$\text{-A-CH}_2\text{—SiR}^1_a(\text{OR}^2)_{3-a} \quad (1)$$

and, if desired, tin catalysts having a tin content of not more than 100 ppm, based on the polymer blend, where A is a divalent linker group selected from —O—, —S—, —(R$^3$)N—, O—CO—N(R$^3$)—, —N(R$^3$)—CO—O—, —N(R$^3$)—CO—NH—, —NH—CO—N(R$^3$)—, and —N(R$^3$)—CO—N (R$^3$)—, R$^1$ is an optionally halogen-substituted alkyl, cycloalkyl, alkenyl or aryl radical having 1–10 carbon atoms, R$^2$ is an alkyl radical having 1–6 carbon atoms or an ω-oxaalkyl-alkyl radical having in total 2–10 carbon atoms, R$^3$ is hydrogen, an optionally halogen-substituted cyclic, linear or branched C$_1$ to C$_{18}$ alkyl or alkenyl radical or a C$_6$ to C$_{18}$ aryl radical, and a is an integer from 0 to 2, with the exception of foamable mixtures comprising isocyanate-free, alkoxysilane-terminated prepolymers having silane terminations of the general formula [2],

$$\text{—X—CO—Y—CH}_2\text{—SiR}^\alpha{}_w(\text{OR}^\beta)_{3-w} \quad [2]$$

in which

X and Y are an oxygen atom, an N$^\beta$Rγ group or a sulfur atom,

R$^\alpha$ is an alkyl, alkenyl or aryl radical having 1–10 carbon atoms,

R$^\beta$ is an alkyl radical having 1–2 carbon atoms or an ω-oxaalkyl-alkyl radical having in total 2–10 carbon atoms, Rγ is a hydrogen atom, an alkyl, cycloalkyl, alkenyl or aryl radical having 1–10 carbon atoms or a CH$_2$—SiR$^\alpha{}_w$(OR$^\beta$)$_{3-w}$ group, and w denotes the value 0 or 1, with the proviso that at least one of the two groups, X or Y, is an NH function, and propellants.

A feature of the polymers (A) is that they contain alkoxysilyl groups separated only by a methyl spacer from an electronegative heteroatom having at least one free electron pair. This gives these polymers an extremely high reactivity toward moisture, so that they can be processed to polymer blends which even with little or even no tin catalyst, preferably with no tin or titanium catalyst, more preferably without heavy metal catalyst at all, cure at room temperature with sufficiently short tack-free times or with sufficiently high cure rate.

Radicals $R^1$ are preferably methyl, ethyl or phenyl groups. Radicals $R^2$ are preferably methyl or ethyl groups and radicals $R^3$ are preferably hydrogen, alkyl radicals having 1–4 carbon atoms, cyclohexyl radicals and phenyl radicals.

Particular preference is given to alkoxylsilyl-terminated polymers (A) whose crosslinkable alkoxysilyl groups are separated by a methyl spacer from a linker group such as urethane or urea groups, i.e., polymers (A) corresponding to the general formula (1) wherein A is selected from the groups —O—CO—N($R^3$)—, —N($R^3$)—CO—O—, —N($R^3$)—CO—NH—, —NH—CO—N($R^3$)—, and —N($R^3$)—CO—N($R^3$)—.

If A in the alkoxysilyl-terminated polymers (A) is a group —O—CO—N($R^3$)—, these polymers have particularly low viscosities. This is of advantage for many applications. In particular $R^3$ in this case is hydrogen.

The main chains of the alkoxysilane-terminated polymers (A) can be branched or unbranched. The average chain lengths can be adapted arbitrarily, in accordance with the particular properties desired, both in the uncrosslinked mixture and in the cured composition. They may be synthesized from different building blocks. Normally these are polysiloxanes, polysiloxane-urea/urethane copolymers, polyurethanes, polyureas, polyethers, polyesters, polyacrylates and polymeth-acrylates, polycarbonates, polystyrenes, polyamides, polyvinyl esters or polyolefins such as polyethylene, polybutadiene, ethylene-olefin copolymers or styrene-butadiene copolymers. It will be appreciated that any desired mixtures or combinations of polymers having different main chains can also be used.

For the preparation of polymers (A) having silane terminations of the general formula (1) a multiplicity of possibilities are known, including in particular:

Copolymerizations involving unsaturated monomoners possessing groups of the general formula (1). Possible examples of such monomers are (meth)acryloyloxymethyl-trimethoxysilane, (meth)-acryloyloxymethyl-methyldimethoxysilane, or else the corresponding ethoxysilyl compounds.

Polyadditions of oxirane derivatives in the presence of epoxy-functional monomers possessing groups of the general formula (1). Possible examples of such monomers are glycidyloxymethyl-trimethoxysilane, glycidyloxymethyl-methyldimethoxysilane or else the corresponding ethoxysilyl compounds. It will be appreciated that the silane monomers can also be grafted onto suitable OH-terminated prepolymers.

Grafting of unsaturated monomers possessing groups of the general formula (1) onto thermoplastics such as polyethylene. Possible examples of such monomers are (meth-)acryloyloxymethyl-trimethoxysilane, (meth)-acryloyloxymethyl-methyldimethoxysilane or else the corresponding ethoxysilyl compounds.

Reaction of the prepolymer (A1) with one or more organosilanes (A2) of the general formula (3)

$$C\text{—}B\text{—}CH_2\text{—}SiR^1_a(OR^2)_{3-a} \quad (3)$$

where $R^1$, $R^2$, $R^3$, and a are as defined above,

B is an oxygen, nitrogen or sulfur atom, and

C—B— is a functional group which is reactive toward suitable functional groups of the prepolymer (A1).

If the prepolymer (A1) is itself composed of two or more building blocks (A11, A12, etc.) then it is not absolutely necessary to first prepare the prepolymer (A1) from these building blocks (A11, A12, etc.) and then react it with the silane (A2) to form the finished polymer (A). Thus, here as well, it is possible to turn the reaction steps around, by first reacting one or more building blocks (A11, A12, etc.) with the silane (A2) and only then reacting the resulting compounds with the remaining building blocks (A11, A12, etc.) to form the finished polymer (A).

Examples of prepolymers (A1) composed of building blocks A11, A12 are OH—, NH— or NCO-terminated polyurethanes and polyureas, which can be prepared from polyisocyanates (building block A11) and also polyols (building block A12).

In one preferred mode of preparation of the polymers (A) it is preferred to use a silane (A2) selected from silanes of the general formula (4) and (5)

$$Z\text{-}CH_2\text{—}SiR^1_a(OR^2)_{3-a} \quad (4)$$

$$OCN\text{—}CH_2\text{—}SiR^1_a(OR^2)_{3-a} \quad (5)$$

where

Z is an OH, SH or $NHR^3$ group and $R^1$, $R^2$, $R^3$, and a are as defined above.

When the silane of the general formula (4) is used it is reacted preferably with an NCO-terminated prepolymer (A1) or else with an NCO-containing precursor (A11) of the prepolymer. The latter is then reacted in further steps to form the finished polymer (A).

When silane of the general formula (5) is used it is reacted preferably with an isocyanate-reactive prepolymer (A1), i.e., a prepolymer (A1) having OH, SH or $NHR^3$ functions, or else with a correspondingly terminated precursor (A11) of the prepolymer. The latter is then reacted in further steps to form the finished polymer (A). The use of silane of the general formula (5) is preferred, since the resulting alkoxysilyl-terminated polymers (A) have particularly low viscosities, especially when prepolymer (A1) having OH functions is used.

Preferred building blocks (A11, A12, etc.) for the preparation of the polymers (A) include, in addition to the silanes (A2) of the general formulae (4) and (5), OH-terminated polyols, monomeric alcohols/amines having at least 2 OH/NH functions and/or hydroxyalkyl- or aminoalkyl-terminated polydiorganosiloxanes, and also di- or polyisocyanates.

In the preparation of the polymer (A) the concentrations of all isocyanate groups involved in all reaction steps and of all isocyanate-reactive groups, and also the reaction conditions, are preferably chosen so that in the course of the polymer synthesis all of the isocyanate groups are consumed by reaction. The finished polymer (A) is therefore preferably isocyanate-free.

Examples of polyols for the preparation of the polymers (A) are in particular aromatic and aliphatic polyesterpolyols and polyetherpolyols, such as are widely described in the literature. In principle, however, it is possible to use all polymeric, oligomeric or even monomeric alcohols having two or more OH functions.

As hydroxyalkyl- or aminoalkyl-terminated polysiloxanes it is preferred to use compounds of the general formula (6)

$$Z-R^6-[Si(R^5)_2-O-]_n-Si(R^5)_2-R^6-Z \quad (6)$$

in which
$R^5$ is a hydrocarbon radical having 1 to 12 carbon atoms, preferably methyl radicals,
$R^6$ is a branched or unbranched hydrocarbon chain having 1–12 carbon atoms, preferably trimethylene, and
n is a number from 1 to 3000, preferably a number from 10 to 1000, and
Z is as defined above.

Examples of customary diisocyanates are diisocyanatodiphenylmethane (MDI), both in the form of crude or technical-grade MDI and in the form of pure 4,4' and/or 2,4' isomers or mixtures thereof, tolylene diisocyanate (TDI) in the form of its various regioisomers, diisocyanatonaphthalene (NDI), isophorone diisocyanate (IPDI) or else hexamethylene diisocyanate (HDI). Examples of polyisocyanates are polymeric MDI (P-MDI), triphenylmethane triisocyanate or biuret triiso-cyanates.

The polymers (A) in the polymer blends of the invention are sufficiently reactive toward moisture even at room temperature that they cure at a very high rate. With methoxysilane-terminated polymers (A), where $R^2$ is a methyl radical, even tin-free systems featuring tack-free times of less than one minute are even possible.

The polymer blends of the invention are preferably free from tin catalysts, especially organotin compounds, the absence of titanium catalysts likewise being preferred. With particular preference the polymer blends of the invention are free from any heavy metal catalysts whatsoever. By catalysts in this context are meant compounds capable of catalyzing the curing of the polymer blend. These are, in particular, organic heavy metal compounds. Heavy metals in this context are taken to be all metals apart from the light metals, i.e., the alkali metals and alkaline earth metals and also aluminum and scandium. Catalytically inactive and toxicologically and environmentally unobjectionable titanium dioxide can be added as a filler or pigment even to these preferred polymer blends.

In the polymer blends it is possible with preference to use organic amino compounds as basic catalysts. Examples are aminopropyltrimethoxysilane, aminomethyl-trimethoxysilane, aminomethyl-methyldimethoxysilane, N-(2-aminoethyl)-aminopropyltrimethoxysilane, triethyl-amine, tributylamine, 1,4-diazabicyclo[2.2.2]octane, N,N-bis(N,N-dimethyl-2-aminoethyl)methylamine, N,N-dimethylcyclohexylamine, N,N-dimethylphenylamine, N-ethylmorpholine, etc. These catalysts are used preferably in concentrations of 0.01–10% by weight. The various catalysts can be used either in pure form or as mixtures of different catalysts. Preferred catalysts are compounds of the general formula (7), $$Z-R^4-SiR^1_a(OR^2)_{3-a} \quad (7)$$

where
Z is an $NHR^3$ group and
$R^4$ is a branched or unbranched hydrocarbon radical having 1–10 carbon atoms optionally interrupted by oxygen or $N(R^3)$ groups, and
$R^1$, $R^2$, $R^3$ and a are as defined above.

If $R^4$ is, as preferred, a $CH_2$ group the general formula (7) corresponds to the general formula (4).

If needed, the catalysts described can be added in whole or else only in part during the actual synthesis of the polymers (A).

If in the preparation of the polymers (A) one or more compounds of the general formula (4) in which Z has the definition $NHR^3$ are used as organosilanes (A2) then these silanes, insofar as they are still present in catalytically active amounts of 0.01–10% by weight in the finished polymer blend of the invention, may likewise adopt the role of a curing catalyst. Where tin catalysts are used in the polymer blends comprising alkoxysilane-terminated polymers (A), just very small amounts, with a tin content of not more than 100 ppm, preferably not more than 50 ppm, and more preferably not more than 10 ppm, are sufficient.

It is of particular advantage that it is also possible to prepare polymer blends of the invention which, although containing exclusively relatively non-reactive ethoxysilane-terminated polymers (A), in which $R^2$ is an ethyl radical, are yet so reactive toward moisture that even without a tin catalyst they cure at a sufficiently high rate. Accordingly, even with ethoxysilane-terminated polymers (A), tin-free systems having tack-free times of below 10 minutes are possible. Such polymer blends of the invention, containing exclusively ethoxysilane-terminated polymers (A), possess the advantage that the only elimination product they release on curing is ethanol. They represent a preferred embodiment of this invention.

The polymer blends of the invention may comprise, as further components, conventional auxiliaries, such as fillers, water scavengers, reactive diluents, adhesion promoters, plasticizers, thixotropic agents, light stabilizers, fungicides, flame retardants, pigments, etc., such as are known for use in all conventional alkoxy-crosslinking one-component compositions. In order to produce the particular desired profiles of properties both of the uncrosslinked polymer blends and of the cured compositions it is generally unavoidable to make such additions.

Countless different applications exist for the polymer blends of the invention in the field of adhesives and sealants, including joint sealants, surface coatings, and also in the production of moldings.

They are suitable for numerous different substrates such as, for example, mineral substrates, metals, plastics, glass, ceramic material, etc.

The polymer blends of the invention can be employed either in pure form or in the form of solutions or dispersions.

All of the above symbols in the above formulae have their definitions in each case independently of one another. In all formulae the silicon atom is tetravalent.

The examples which follow serve to illustrate the invention without restricting it. Unless specified otherwise all amounts and percentages are by weight, all pressures are 0.10 MPa (abs.), and all temperatures are 20° C.

Reported as a measure of the reactivities of the polymer blends of the invention—or of the reactivities of the noninventive polymer blends in the comparative examples—are in each case the tack-free times. The tack-free times are more suitable here than the times which elapse before complete cure through volume, since the latter are dependent not only on the reactivity of the polymer blends of the invention but also on the water vapor permeability of the fully or partly cured surface layers. Moreover, the tack-free times can be determined with greater accuracy. By tack-free time is meant that period of time which elapses following the application of the polymer in air until the polymer surface has cured to the extent that when contacted with a laboratory spatula this surface neither leaves polymer compound adhering on the spatula nor exhibits stringing.

EXAMPLE 1

Preparation of isocyanatomethyl-trimethoxysilane

Starting from chloromethyl-trimethoxysilane methyl-carbamatomethyl-trimethoxysilane is synthesized by known methods (U.S. Pat. No. 3,494,951).

It is pumped in a stream of argon gas into a quartz pyrolysis tube packed with quartz wool. The temperature in the pyrolysis tube is between 420 and 470° C. At the end of the heated section the crude product is condensed by means of a condenser and collected. The colorless liquid is purified by distillation under reduced pressure. The desired product goes over at the top at about 88–90° C. (82 mbar) in a purity of more than 99%, while at the bottom the unreacted carbamate can be isolated again. It is supplied again directly to the pyrolysis.

In this way, starting from 56.9 g (273 mmol) of methyl-carbamatomethyl-trimethoxysilane, 33.9 g (191 mmol) of the desired product, isocyanatomethyl-trimethoxysilane, are contained in a purity >97%. This corresponds to a yield of 70% of theory.

The analogous method is used to prepare the further-described silanes: isocyanatomethyl-methyldimethoxy-silane, isocyanatomethyl-triethoxysilane, and iso-cyanatomethyl-methyldiethoxysilane.

EXAMPLE 2

Preparation of N-phenylaminomethyl-trimethoxysilane

The entirety of 537 g (5.77 mol) of aniline is introduced into a laboratory reactor and subsequently rendered inert with nitrogen. It is heated to a temperature of 115° C., 328 g (1.92 mol) of chloromethyl-trimethoxysilane are added dropwise over 1.5 h and stirring is continued at 125–130° C. for 30 minutes more thereafter. Following the addition of approximately 150 g of the silane there is increasing precipitation of anilinium hydrochloride in salt form, but the suspension remains readily stirrable until the end of metering.

Aniline employed in excess (approximately: 180 g) is removed under a good vacuum (62° C. at 7 mbar). Subsequently 350 ml of toluene is added at about 50° C. and the suspension is stirred for 30 minutes at 10° C. in order to effect complete crystallization of anilinium hydrochloride. The latter is subsequently filtered off. The solvent, toluene, is removed at 60–70° C. under a partial vacuum. The residue is purified by distillation (89–91° C. at 0.16 mbar).

A yield of 331.2 g, i.e., 75.9% of theory, is achieved with a product purity of approximately 96.5%.

The same method is used to prepare the further-described N-phenylaminomethyl-triethoxysilane.

EXAMPLE 3

30 g (70.6 mmol) of a linear polypropylene glycol having an average molar mass of 425 g/mol are introduced into a vessel and dewatered under reduced pressure at 100° C. for 1 h. The dewatered glycol mix is subsequently cooled to about 50° C. and at this temperature 24.6 g (141.2 mmol) of toluene 2,4-diiso-cyanate (TDI) are added under nitrogen at a rate such that the temperature does not rise above 90° C. When the addition is over the mixture is stirred at 90° C. for 15 minutes. It is cooled to about 50° C. and 33.7 g (148.3 mmol) of N-phenylaminomethyl-trimethoxysilane are added dropwise. The mixture is subsequently stirred at 90° C. for 60 minutes until isocyanate groups are no longer detectable by means of IR spectroscopy. This gives a clear, transparent polymer having a viscosity of >1000 Pas at 20° C. and 90 Pas at 50° C.

There is no need to add a further curing catalyst. After the mixture has been applied, the tack-free time in air is approximately 2 minutes (standard conditions: 23° C., 50% rh).

EXAMPLE 4

28.6 g (110 mmol) of a branched polypropylene-glycerol with an average molar mass of 260 g/mol and 8.1 g of a polypropylene-glycerol with an average molar mass of 1500 g/mol are introduced into a vessel and dewatered under reduced pressure at 100° C. for 1 hour. The dewatered glycerol mix is subsequently cooled to about 50° C. and at this temperature 10.1 g (57.7 mmol) of toluene 2,4-diisocyanate (TDI) are present under nitrogen. The temperature here should not rise above 80° C. When the addition is over the mixture is stirred at this temperature for 15 minutes more. 44.3 g (250 mmol) of isocyanatomethyl-trimethoxysilane are added to this mixture under a nitrogen atmosphere of 50° C., during which the temperature ought to remain below 60° C. The mixture is subsequently stirred at 80° C. for 60 minutes until isocyanate groups are no longer detectable by means of IR spectroscopy. This gives a clear, transparent polymer having a viscosity of 17 Pas at 50° C.

The polymer obtained is mixed with 2 g of amino-propyltrimethoxysilane as catalyst. Following the subsequent application of the mixture the tack-free time in air is approximately 1.5 minutes (23° C., 50% rh).

EXAMPLE 5

500 g (33.3 mmol) of $\alpha,\overline{\omega}$-hydroxypropyl polydimethylsiloxane having an average molecular weight of 15 000 g/mol are introduced into a vessel and dewatered under reduced pressure at 100° C. for 1 h. After cooling to 30–35° C., 13.0 g (73.3 mmol) of isocyanatomethyl-trimethoxysilane are added and stirring is continued for 30 minutes until isocyanate groups are no longer detectable by IR spectroscopy. This gives a clear, transparent polymer having a viscosity of 9.5 Pas at 20° C.

There is no need to add a further curing catalyst. Following application of the mixture the tack-free time in air is approximately 1 minute (23° C., 50% rh).

EXAMPLE 6

A silane-terminated polymer prepared according to Example 5 is admixed in a laboratory planetary mixer at about 25° C. with 230 g of a trimethylsilyl-terminated polydimethylsiloxane having a viscosity of 100 Pas, 16.7 g of 3-(2-aminoethyl)-aminopropyl-trimethoxy-silane, 16.7 g of vinyltrimethoxysilane, and 85 g of a hydrophilic pyrogenic silica and the mixture is processed within 0.5 h to form a stiff paste.

There is no need to add a further curing catalyst. Following application of the mixture the tack-free time in air is approximately 7 minutes (23° C., 50% rh).

EXAMPLE 7

400 g (50.0 mmol) of a polypropylene glycol having an average molecular weight of 8000 g/mol are introduced into a vessel, dewatered under reduced pressure at 100° C. for 1 hour and polymerized with 6.3 g (28 mmol) of isophorone diisocyanate at 100° C. over the course of 60 minutes. The OH-terminated polyurethane prepolymer obtained is subsequently cooled to 60° C., admixed with 9.9 g (56 mmol) of isocyanatomethyl-trimethoxysilane and stirred for 60 minutes until an isocyanate band is no longer present in the IR spectrum. This gives a clear, transparent polymer having a viscosity of 85 Pas at 20° C.

There is no need to add a further curing catalyst. Following application of the mixture the tack-free time in air is approximately 3.5 minutes (23° C., 50% rh).

EXAMPLE 8

A silane-terminated polymer prepared according to Example 7 is admixed in a laboratory planetary mixer at approximately 25° C. with 155 g of diisoundecyl phthalate, 21.0 g of 3-(2-aminoethyl)aminopropyl-trimethoxysilane, 21.0 g of vinyltrimethoxysilane, and 435 g of precipitated and dried chalk (dried before-hand, water content <50 ppm) and the mixture is processed to a stiff paste.

There is no need to add a further curing catalyst. Following application of the mixture the tack-free time in air is approximately 15 minutes (23° C., 50% rh).

EXAMPLE 9

400 g (50.0 mmol) of a polypropylene glycol having an average molecular weight of 8000 g/mol are introduced into a vessel, dewatered under reduced pressure at 100° C. for 1 hour and polymerized with 6.3 g (28 mmol) of isophorone diisocyanate at 100° C. over the course of 60 minutes. The OH-terminated polyurethane prepolymer obtained is subsequently cooled to 60° C., admixed with 12.3 g (56 mmol) of isocyanatomethyl-triethoxysilane and stirred for 60 minutes until an isocyanate band is no longer visible in the IR spectrum. This gives a clear, transparent polymer having a viscosity of 80 Pas at 20° C.

There is no need to add a further curing catalyst. Following application of the mixture the tack-free time in air is approximately 6.5 minutes (23° C., 50% rh).

EXAMPLE 10

400 g (50.0 mmol) of a polypropylene glycol having an average molecular weight of 8000 g/mol are introduced into a vessel, dewatered under reduced pressure at 100° C. for 1 hour and polymerized with 6.3 g (28 mmol) of isophorone diisocyanate at 100° C. over the course of 60 minutes. The OH-terminated polyurethane prepolymer obtained is subsequently cooled to 60° C., admixed with 9.0 g (56 mmol) of isocyanatomethyl-methyldimethoxy-silane and stirred for 60 minutes until an isocyanate band is no longer visible in the IR spectrum. This gives a clear, transparent polymer having a viscosity of 77 Pas at 20° C.

50 g of the polymer obtained are mixed with 2 g of phenylaminomethyl-trimethoxysilane as catalyst. Following subsequent application of the mixture the tack-free time in air is approximately 2.5 minutes (23° C. 50% rh).

EXAMPLE 11

400 g (50.0 mmol) of a polypropylene glycol having an average molecular weight of 8000 g/mol are introduced into a vessel, dewatered under reduced pressure at 100° C. for 1 hour and polymerized with 6.3 g (28 mmol) of isophorone diisocyanate at 100° C. over the course of 60 minutes. The OH-terminated polyurethane prepolymer obtained is subsequently cooled to 60° C., admixed with 10.6 g (56 mmol) of isocyanatomethyl-methyldiethoxy-silane and stirred for 60 minutes until an isocyanate band is no longer visible in the IR spectrum. This gives a clear, transparent polymer having a viscosity of 85 Pas at 20° C.

50 g of the polymer obtained are mixed with 2 g of phenylaminomethyl-trimethoxysilane as catalyst. Following subsequent application of the mixture the tack-free time in air is approximately 5.5 minutes (23° C., 50% rh).

COMPARATIVE EXAMPLE 1

The procedure of Example 3 is repeated. However, before being applied in air, the polymer mixture is admixed with 0.3 g of dibutyltin dilaurate. Following application of the polymer mixture in air (23° C., 50% rh) the added tin catalyst does not lead to any notable further acceleration of skinning. The tack-free time is approximately 2 minutes.

COMPARATIVE EXAMPLE 2

The procedure of Example 3 is repeated. However, 38.9 g (148.3 mmol) of N-phenyl-3-aminopropyl-trimethoxysilane —instead of N-phenylaminomethyl-trimethoxysilane—are used. This gives a clear, transparent polymer in which isocyanate groups are no longer detectable by IR spectroscopy. The polymer possesses a viscosity of 19 Pas at 50 C.

Without addition of a further curing catalyst the tack-free time in air is several hours (23° C., 50% rh).

COMPARATIVE EXAMPLE 3

The procedure of Example 5 is repeated. However, 15.8 g (73.3 mmol) of isocyanatopropyl-trimethoxysilane—instead of isocyanatomethyl-trimethoxysilane—are used. This gives a clear, transparent polymer in which isocyanate groups are no longer detectable by IR spectroscopy. The polymer possesses a viscosity of 9.0 Pas at 20° C.

Without addition of a further curing catalyst the tack-free time in air is several days (23° C., 50% rh).

COMPARATIVE EXAMPLE 4

50 g of a commercial sec-aminopropyl-silane-terminated polyurethane (Desmoseal® LS 2237 from Bayer AG) are mixed with 2 g of phenylaminomethyltrimethoxysilane as catalyst. Following subsequent application of the mixture the tack-free time in air is several hours (23° C., 50% rh).

The invention claimed is:

1. A moisture curable, non-aqueous, alkoxy-crosslinking one-component polymer blend comprising at least one alkoxysilane-terminated polymer (A) having end groups of the formula (1)

$$-A-CH_2-SiR^1{}_a(OR^2)_{3-a} \qquad (1)$$

and, optionally, one or more tin catalysts in an amount of not more than 100 ppm Sn, based on the weight of the polymer blend, where A is an —O—, —S—, —(R³)N—, O—CO—N(R³)—, or —N(R³)—CO—O—, divalent linker group, R¹ is an optionally halogen-substituted alkyl, cycloalkyl, alkenyl or aryl radical having 10 carbon atoms or less, R² is an alkyl radical having 1–6 carbon atoms or an ω-oxyalkyl-alkyl radical having in total 2–10 carbon atoms, R³ is hydrogen, an optionally halogen-substituted cyclic, linear, or branched $C_1$ to $C_{18}$ alkyl, $C_{2-18}$ alkenyl, or $C_6$ to $C_{18}$ aryl radical, and a is an integer from 0 to 2, with the proviso that said polymer blend is not:

a foamable mixture comprising an isocyanate-free, alkoxysilane-terminated prepolymer of the formula [2],

  [2]

in which

X and Y are an oxygen atom, an NRγ group or a sulfur atom, $R^\alpha$ is an alkyl, alkenyl or aryl radical having 1–10 carbon atoms, $R^\beta$ is an alkyl radical having 1–2 carbon atoms or an ω-oxyalkyl-alkyl radical having in total 2–10 carbon atoms, Rγ is a hydrogen atom, an alkyl, cycloalkyl, alkenyl or aryl radical having less than 10 carbon atoms or a $CH_2$—$SiR^\alpha_w(OR^\beta)_{3-w}$ group, and w is 0 or 1, where at least one of the two groups, X or Y, is an NH function, and at least one propellant.

2. The polymer blend of claim 1, which is free from tin catalyst.

3. The polymer blend of claim 1, which is free from heavy metal catalyst.

4. The polymer blend of claim 1, in which the radicals R¹ are independently methyl, ethyl or phenyl radicals.

5. The polymer blend of claim 2, in which the radicals R¹ are independently methyl, ethyl or phenyl radicals.

6. The polymer blend of claim 3, in which the radicals R¹ are independently methyl, ethyl or phenyl radicals.

7. The polymer blend of claim 1, in which the radicals R² independently are methyl or ethyl radicals.

8. The polymer blend of claim 2, in which the radicals R² independently are methyl or ethyl radicals.

9. The polymer blend of claim 1, further comprising a water scavenger.

10. The polymer blend of claim 1, further comprising a water scavenger and a filler.

11. The polymer blend of claim 1, in which each A independently is a divalent linker group —O—CO—N(R³)— or N(R³)—CO—O—.

12. The polymer blend of claim 2, in which each A independently is a divalent linker group —O—CO—N(R³)— or N(R³)—CO—O—.

13. The polymer blend of claim 3, in which each A independently is a divalent linker group —O—CO—N(R³)— or N(R³)—CO—O—.

14. The polymer blend of claim 4, in which each A independently is a divalent linker group —O—CO—N(R³)— or N(R³)—CO—O—.

15. The polymer blend of claim 7, in which each A independently is a divalent linker group —O—CO—N(R³)— or N(R³)—CO—O—.

16. The polymer blend of claim 1, wherein polymer (A) is a reaction product of at least one silane of the formula (5)

  (5)

with an isocyanate-reactive prepolymer.

17. The polymer blend of claim 1, further comprising at least one organic amino compound as a basic catalyst.

18. The polymer blend of claim 17, wherein at least one basic catalyst comprises a compound of the formula (7)

  (7)

where

Z is an NHR³ group and

R⁴ is a branched or unbranched hydrocarbon radical having 1–10 carbon atoms optionally interrupted by oxygen or N(R³) groups.

19. An adhesive or sealant composition, comprising the polymer blend of claim 1.

20. A surface coating or molding composition, comprising the polymer blend of claim 1.

* * * * *